United States Patent
Kristiansen et al.

(10) Patent No.: US 10,982,850 B2
(45) Date of Patent: Apr. 20, 2021

(54) FLOW MEASUREMENT SYSTEM

(71) Applicant: exodraft a/s, Langeskov (DK)

(72) Inventors: Klaus Damm Kristiansen, Odense SØ (DK); Jan Schmidt-Mogensen, Odense SØ (DK)

(73) Assignee: exodraft a/s, Langeskov (DK)

(*) Notice: Subject to any disclaimer, the term of this patent is extended or adjusted under 35 U.S.C. 154(b) by 126 days.

(21) Appl. No.: 16/425,210

(22) Filed: May 29, 2019

(65) Prior Publication Data
US 2019/0368732 A1 Dec. 5, 2019

(30) Foreign Application Priority Data
May 31, 2018 (EP) ..................... 18175328

(51) Int. Cl.
*F23N 5/18* (2006.01)
*F23N 5/24* (2006.01)
*G01F 1/34* (2006.01)

(52) U.S. Cl.
CPC .............. *F23N 5/18* (2013.01); *F23N 5/242* (2013.01); *G01F 1/34* (2013.01); *F23N 2005/181* (2013.01); *F23N 2225/06* (2020.01)

(58) Field of Classification Search
CPC ........ F23N 5/18; F23N 5/242; F23N 2225/06; F23N 2005/181; G01F 1/34; F24B 5/028; F24C 3/025; F24C 15/002; G01L 19/0654
See application file for complete search history.

(56) References Cited

U.S. PATENT DOCUMENTS

| | | | |
|---|---|---|---|
| 4,911,021 A | 3/1990 | Shortridge | |
| 5,837,903 A * | 11/1998 | Weigand | G01F 1/48 73/861.42 |
| 6,668,663 B2 * | 12/2003 | May | G01F 1/44 73/861.05 |
| 2020/0271312 A1 * | 8/2020 | Litka | F22B 37/42 |

FOREIGN PATENT DOCUMENTS

| | | | |
|---|---|---|---|
| DE | 102013200840 A1 | 7/2013 | |
| DE | 102012109632 A1 | 4/2014 | |
| DK | WO2011009458 A1 * | 1/2011 | ............... G01F 1/34 |
| EP | 1070948 A1 | 1/2001 | |
| GB | 2202622 A | 9/1988 | |
| JP | 61-13112 | 1/1986 | |

* cited by examiner

*Primary Examiner* — David J Laux
*Assistant Examiner* — Nikhil P Mashruwala
(74) *Attorney, Agent, or Firm* — Knobbe Martens Olson & Bear LLP (57) ABSTRACT

The present invention relates to a flow measurement system for controlling a gas fireplace (1) comprising a flow passage (11) in fluid communication with the gas fireplace by use of a differential pressure pressostat (13). A first gauge connector (14) is in the flow passage and connected to a first pressure sensor in the differential pressure pressostat for measuring a total pressure in a fluid flowing in the flow passage. A second gauge connector (15) is arranged near the first gauge connector and connected to a second pressure sensor in the differential pressure pressostat for measuring a static pressure in the fluid flowing in the flow passage. Based on these measures a dynamic pressure, and there from the flow velocity, in the fluid flowing in the flow passage is determined and used to switch off the gas fireplace, when the flow becomes below a set threshold value.

9 Claims, 6 Drawing Sheets

FLOW MEASUREMENT SYSTEM

CROSS REFERENCE TO RELATED APPLICATIONS

This application claims the benefit of priority to European Patent Application No. 18175328.6, filed on May 31, 2018. The disclosure of the above-referenced application is hereby expressly incorporated by reference in its entirety.

BACKGROUND OF THE INVENTION

Field of the Invention

The present invention relates to a flow measurement system and in particular to a flow measurement system which is arranged for use in a chimney fan system installed on a chimney connected to a gas fireplace.

Description of the Related Art

The present invention has been developed in relation to chimney fan systems for use together with gas fireplaces. Gas fireplaces are typically used instead of traditional wood burning fireplaces when it is desired to provide the cosiness thereof without the related work and pollution and with an easier switching on and off. A gas fireplace is designed to simulate burning wood in a traditional fireplace but with the combustible source being gas instead of wood. A gas fireplace is typically closed and connected to a chimney consisting of two concentric pipes so that fresh air for the combustion is drawn in through the outer pipe and the flue gas from the combustion is led out through the inner pipe. By using a closed fireplace, the high amount of heated air otherwise being removed from the room in which the fireplace is placed can be avoided.

When the chimney of such a closed gas fireplace exceeds a certain length, or when the chimney has a non-vertical orientation, it is necessary to provide it with a chimney fan system to ensure a sufficient draft. This is due to the increased resistance against flow as well as the heat exchange between the hot flue gas and the cold incoming air. In order to increase the safety of the system, it is known to provide the chimney fan system with a flow measurement system, which monitors the flow velocity in the chimney and switches off the gas fireplace, if the flow falls below a set threshold. Such a low flow velocity could e.g. be due to a leakage to the room in which the gas fireplace is located; this would cause a high safety risk. A safety system could also be used to ensure during start-up of the gas fireplace that the fireplace cannot be switched on until a sufficiently large draft has been obtained in the chimney, if necessary by use of a chimney fan system comprising a motor-driven fan.

A flow measurement system used within this technical field is typically a differential pressure pressostat with gauge connectors arranged in the flow passage to measure the total pressure and the static pressure. From these measures, the pressostat determines the dynamic pressure and thereby the flow velocity of the flue gas. The combustion of the gas results in the formation of water in the flue gas. With long chimneys, the heat exchange between the incoming air and the flue gas can result in such a cooling of the flue gas before it reaches the flow measurement system that the water contained therein condenses to form drops of water on the gauge connectors of the flow measurement system. Such water causes the flow measurement system to stop working as intended e.g. if a drop of water on the gauges results in an erroneous measurement of no-flow and thereby switching off the gas fireplace.

Hence, an improved flow measurement system would be advantageous, and in particular a more reliable flow measurement system would be advantageous.

OBJECT OF THE INVENTION

It is an object of the present invention to provide a flow measurement system which is less sensitive to the humidity in the flow passage in which it is installed than known systems.

It is another object of the present invention to provide a flow measurement system with which a more efficient control of a gas fireplace associated with the flow measurement system is obtain than with known systems.

It is another object of the present invention to provide a flow measurement system with which known problems with formation of water droplets on the gauge connectors of the flow measurement system of a chimney fan system can be avoided.

It is a further object of the present invention to provide an alternative to the prior art.

In particular, it may be seen as an object of the present invention to provide a flow measurement system that solves the above-mentioned problems of the prior art.

SUMMARY OF THE INVENTION

Thus, the above-described object and several other objects are intended to be obtained in a first aspect of the invention by providing a flow measurement system for controlling a gas fireplace, the flow measurement system comprising:
  a flow passage defined by at least one flow-defining wall, the flow passage being in fluid communication with the gas fireplace to be controlled and being adapted to convey exhaust gas from the gas fireplace,
  a differential pressure pressostat,
  a first gauge connector arranged in the flow passage and connected to a first pressure sensor in the differential pressure pressostat, which first pressure sensor is configured to measure a total pressure in a fluid flowing in the flow passage, when the system is in use, and
  a second gauge connector arranged in the flow passage and near the first gauge connector and connected to a second pressure sensor in the differential pressure pressostat, which second pressure sensor is configured to measure a static pressure in the fluid flowing in the flow passage, when the system is in use,
  wherein:
  the differential pressure pressostat is configured to determine a dynamic pressure in the fluid flowing in the flow passage, when the system is in use, based on signals from the first and second pressure sensors and in response thereto provide an output signal to the gas fireplace, and
  wherein:
  the second gauge connector is arranged within a space defined by a surrounding wall having at least one opening facing towards the first gauge connector,
  the surrounding wall and the at least one opening being dimensioned and shaped so that, when the flow measurement system is in use:

the static pressure in the space is the same or substantially the same as around the first gauge connector, and there is no or substantially no flow of fluid in the space, whereby formation of water droplets on the second gauge connector is prevented.

The flow passage defined by the at least one flow-defining wall may be a part of the exhaust pipe of the gas fire place, such as a part of an exhaust fan of a chimney fan system according to the second aspect of the invention. It may also be possible to consider the whole of the exhaust pipe as the flow passage.

By specifying that the second gauge connector is arranged near the first gauge connector is preferably meant that the distance between the first and second gauge connectors should be so that the total pressure and the static pressure are measured in the same or substantially the same measuring plane. Hereby the static pressure measured by the second sensor is the same or substantially the same as the static pressure at the location of the first gauge connector, i.e. where the total pressure is measured. The distance to chose for a given application will depend on the necessary precision of the measurements which again may be determined e.g. by official safety regulations.

The fluid flowing in the flow passage when the system is in use will mainly be the flue gas from the gas fireplace.

The possibility of avoiding the formation of water droplets means that malfunctioning of the flow measurement system can be prevented, since such water droplets would otherwise cause the pressostat to switch off the gas fireplace even though the flow velocity of the flue gas was high enough. The resulting higher reliability of a flow measurement system according to the present invention than for knows systems has made it possible to increase the length of a chimney compared to known chimneys. With known systems, long chimneys would increase the risk of water formation due to the significant cooling of the flue gas before reaching the chimney fan system where the pressure measurement is typically arranged.

The present invention is also useful in relation to non-vertical chimneys, which must be provided with a chimney fan system in order to ensure a draft in the chimney in another direction than what is the case for natural vertical convection in traditional chimneys.

The possibilities of both longer vertical chimneys, non-vertical chimneys and combinations thereof have significantly increased the design freedom in building houses and multi-storey buildings.

The first and second gauge connectors would typically be arranged in a narrowing section of the flow passage where the flow velocity and the pressure are highest to ensure precise measurements even for relatively low flow volumes. A high precision in the measurements is obtained by having the first and second gauge connectors arranged directly in the flow passage in which the measurements of the flow properties are to be performed, the arrangements being so that the fluid flowing in the flow passage directly impacts the gauge connectors. This differs from some known measurement systems in which the impact takes place via another media, such as another fluid used to transfer the pressure forces from the fluid in the flow passage to the surface of the gauge connectors.

In some embodiments of the invention, the surrounding wall has a plurality of openings facing towards the first gauge connector. Hereby it easier to provide a design which ensures that both of the two mentioned conditions are met. One large opening could easily provide the same static pressure but could also make it harder to avoid flow of fluid in the space within the surrounding wall. Too few or too small openings could prevent flow of fluid in the space but could also make it harder to ensure the same static pressure. Therefore the size, shape, number and, if there is a plurality of openings, the mutual arrangement thereof, would have to be determined as part of the design process for a given flow passage. An example of a possible design is shown in the figures, but other designs are also covered as long as the objects of the invention are met.

The surrounding wall may be an end section of a part of the at least one flow-defining wall. Hereby the space can be manufactured by bending an end of the plate material of which a flow-defining wall is made; this will be shown in the figures.

In some embodiments of the invention, the first gauge connector has a bent shape with a first section being parallel to a main flow direction of fluid flowing in the flow passage and a second section being perpendicular or substantially perpendicular to the main flow direction, when the system is in use.

In a second aspect, the present invention relates to a chimney fan system for providing a controllable negative pressure along a chimney, wherein:
  the chimney fan system comprises a motor-driven exhaust fan and a flow measurement system as described above, and
  an exhaust opening of the gas fireplace is connected to the chimney.

In such a chimney fan system, the flow measurement system may be provided in a flow passage of the exhaust fan. In this manner, the flow measurement system can be arranged at a location where the cross-section of the flow passage is typically most narrow so that precise measurements can be made even for low flow rates. The narrowest cross-section will have the highest local flow velocity. An example of a possible design of an exhaust fan having the gauge connectors of a flow measurement system according to the first aspect of the invention arranged therein will be shown in the figures.

Alternatively, the flow measurement system may be provided in the chimney.

For any of the chimney fan systems as mentioned, the chimney may comprise two concentrically arranged chimney pipes connected to a gas fireplace. The gas fireplace is typically closed, so that the chimney is used to draw fresh air for the combustion in through the outer pipe and lead the flue gas from the combustion out through the inner pipe. By using a closed fireplace, the high amount of heated air being removed from the room in which the fireplace is placed can be avoided.

For any of the chimney fan systems as mentioned above, the differential pressure pressostat may be adapted to switch off the gas fireplace if the dynamic pressure is below a predetermined threshold value. The dynamic pressure is directly proportional to the flow velocity squared. Therefore, when a minimum acceptable flow velocity of the flue gas flowing in the chimney is known, a corresponding threshold value of the dynamic pressure can be set in the control system. The pressostat can then be used to switch off the gas supply to the fireplace. Hereby a high safety against gas leakage to the room in which the fireplace is installed or other malfunctioning of the system can be obtained.

The first and second aspects of the present invention may each be combined. These and other aspects of the invention will be apparent from and elucidated with reference to the embodiments described hereinafter.

BRIEF DESCRIPTION OF THE DRAWINGS

The flow measurement system according to the invention will now be described in more detail with regard to the accompanying figures. The figures show one way of implementing the present invention and is not to be construed as being limiting to other possible embodiments falling within the scope of the attached claim set.

DETAILED DESCRIPTION OF THE PREFERRED EMBODIMENT

A flow measurement system according to the present invention has been developed for use in relation to a chimney fan system for providing a controllable negative pressure along a chimney connected to a gas fireplace. An example of such a use is shown schematically in FIG. 1. The gas fireplace 1 is used to simulate an open wood-burning fire, but the flames are due to burning gas supplied from a gas supply 2. An exhaust opening 3 of the gas fireplace 1 is connected to the chimney 4, and the chimney 4 is provided with a chimney fan system 5 which typically comprises a motor-driven exhaust fan. The illustrated gas fireplace 1 is closed, and the chimney 4 comprises two concentrically arranged chimney pipes connected to the gas fireplace 1 so that fresh air for the combustion is drawn in through the outer pipe 6 and the flue gas from the combustion is led out through the inner pipe 7. The flow measurement system, which will be described in details in the following, is preferably provided in a flow passage of the exhaust fan. However, the scope of the invention also covers systems wherein the flow measurement system is provided in the chimney itself, such as in a narrowing of the flow passage of the inner pipe.

Figure 2:
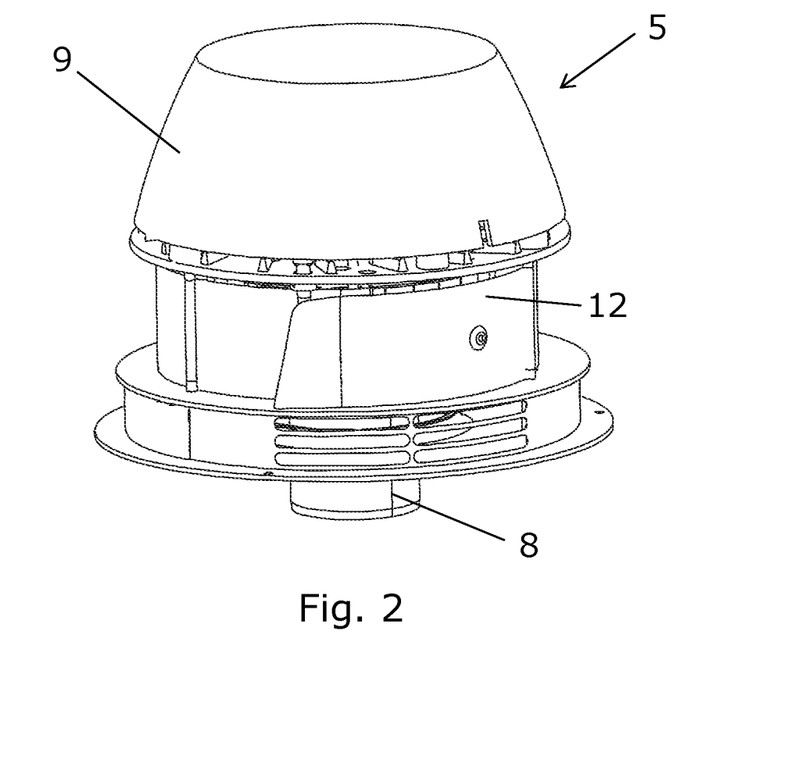
FIG. 2 shows a three-dimensional side view of a chimney fan system according to the present invention.
Figure 3:
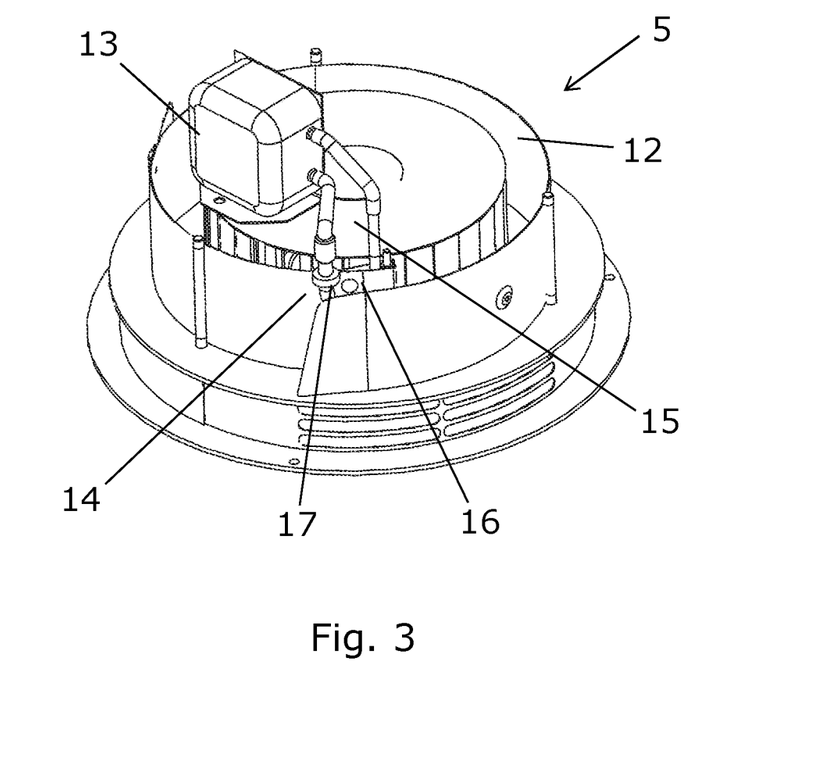
FIG. 3 shows the chimney fan system in FIG. 2 with the top part removed to show the internally arranged parts of the chimney fan system.
Figure 4:
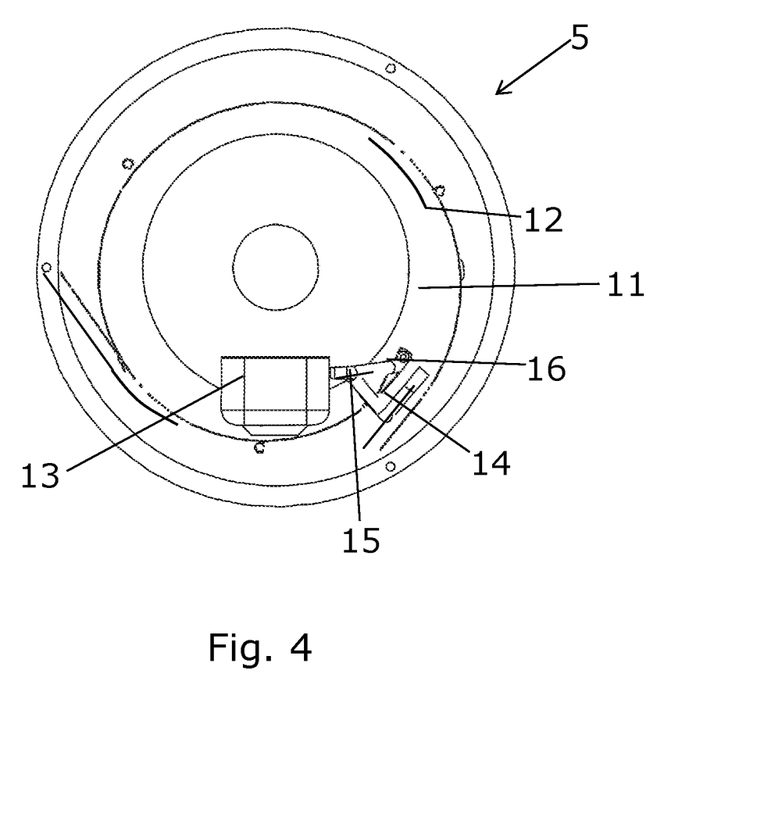
FIG. 4 shows a top view of the chimney fan system in FIG. 3, i.e. with the top part removed.

FIG. 2 shows a three-dimensional side view of a chimney fan system 5 according to the present invention. The chimney fan system 5 comprises a central lower connection piece 8 which is to be connected to the inner pipe 7 of the chimney 4 for drawing out the flue gas. The fresh air is drawn into the outer pipe 6 along the circumference of the chimney fan system 5. To more clearly illustrate the invention, FIG. 3 shows the chimney fan system 5 in FIG. 2 with the top part 9 removed to reveal the internally arranged parts of the chimney fan system 5. FIG. 4 shows a top view of the same chimney fan system 5 also with the top part 9 removed. The flue gas is drawn from the inner pipe by a motor-driven impeller 10 which directs the flow of flue gas towards the flow passage 11 delimited by the volute 12 which is designed to guide the flue gas out of the chimney fan system 5 to the surroundings.

Figure 1:
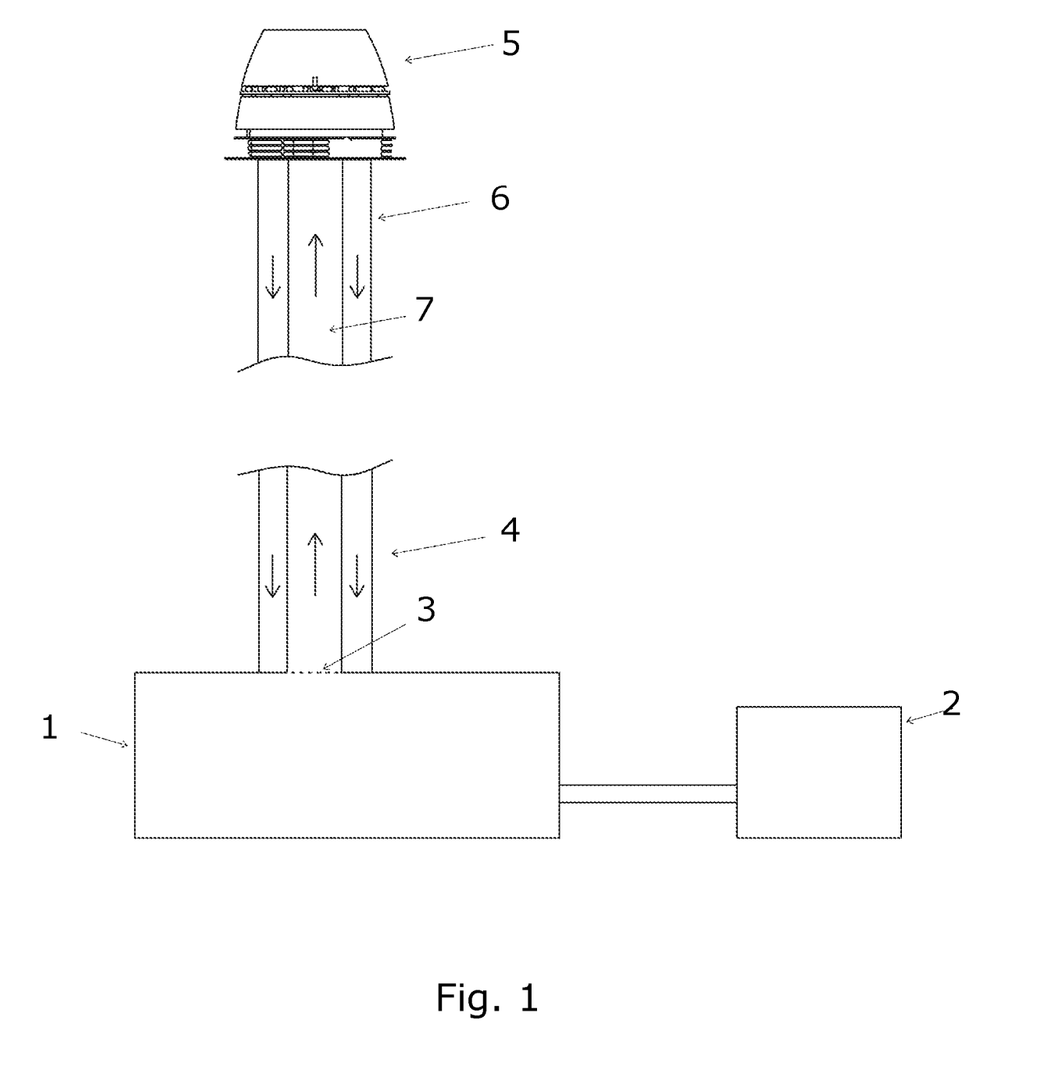
FIG. 1 shows schematically a gas fireplace with a chimney having two concentric pipes and a chimney fan system.
Figure 5:
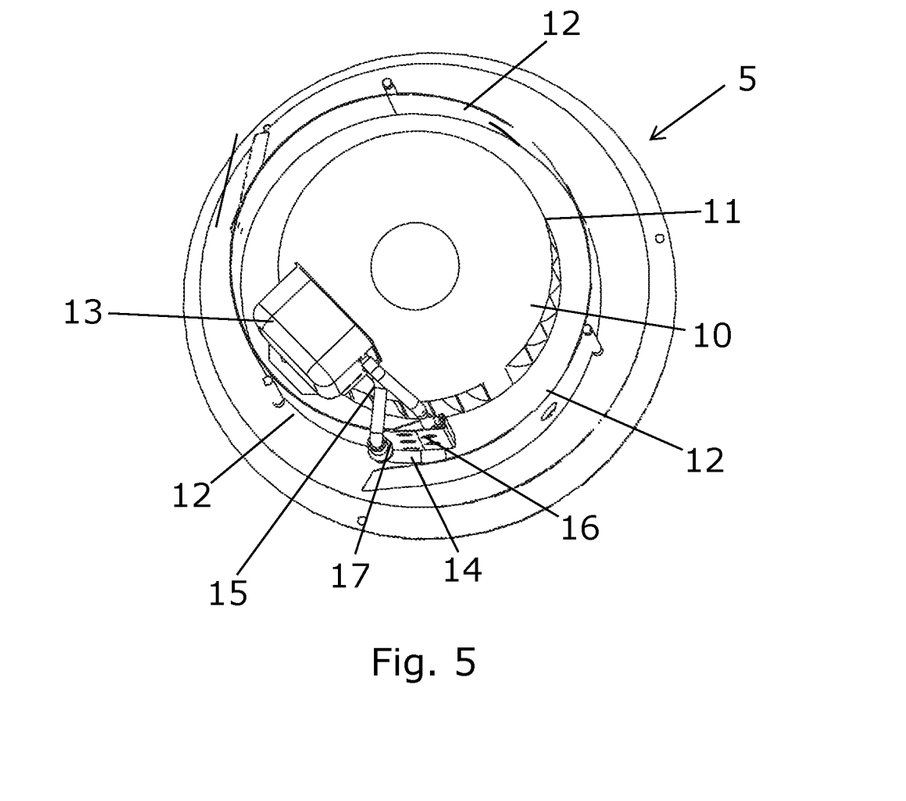
FIG. 5 shows a three-dimensional partly side view of the chimney fan system in FIG. 3.
Figure 6:
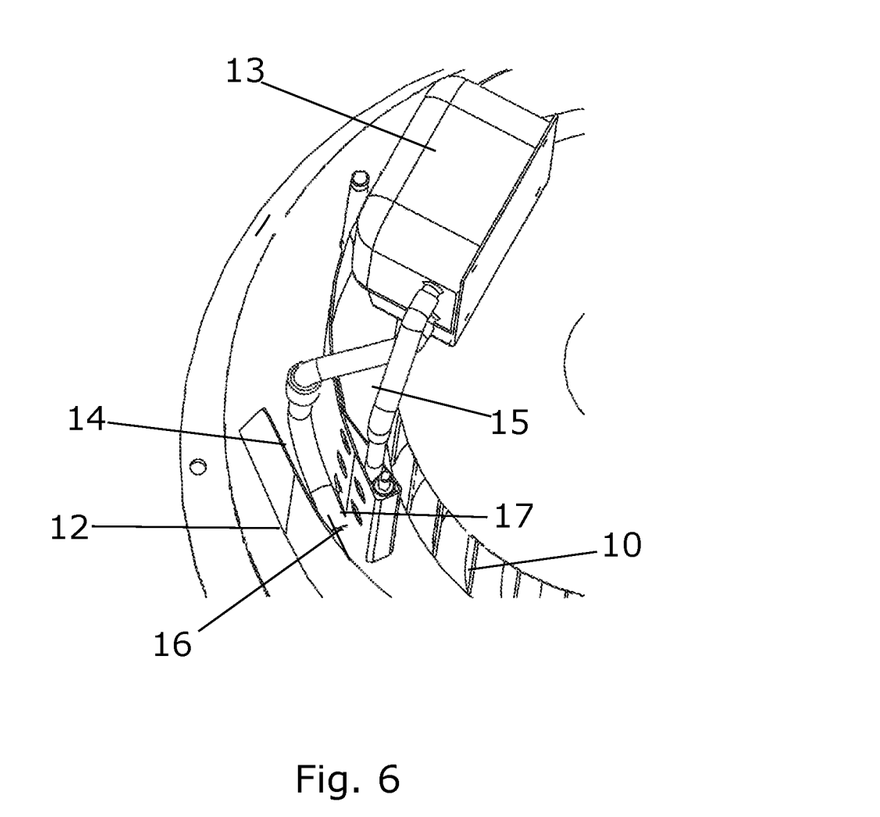
FIG. 6 is a partial three-dimensional view of the region around the gauge connectors.

FIGS. 3 to 6 schematically show a flow measurement system according to the present invention arranged for controlling a gas fireplace 1, such as shown schematically in FIG. 1. The flow measurement system comprises a flow passage 11 which is in fluid communication with the gas fireplace 1 to be controlled. In the illustrated embodiments having the flow measurement system provided in the exhaust fan, the flow-defining wall at the location where the flow measurement system is arranged is part of the volute 12 housing the impeller 10. An advantage of this arrangement is that here the cross-section of the flow passage 11 is smaller than in the chimney 4. This means a higher pressure and flow velocity of the flue gas and thereby larger precision in the measurements. FIG. 5 shows a three-dimensional partly side view of the chimney fan system 5 in FIG. 3, and FIG. 6 is a partial three-dimensional view of the region around the gauge connectors which will be described in the following.

The flow measurement system comprises a differential pressure pressostat 13. A first gauge connector 14 is arranged in the flow passage 11 and connected to a first pressure sensor (not visible in the figures) in the differential pressure pressostat 13. The first pressure sensor is configured to measure a total pressure in a fluid flowing in the flow passage 11, when the system is in use. In the described embodiment, this fluid is the flue gas from the gas fireplace 1. A second gauge connector 15 is arranged near the first gauge connector 14 and connected to a second pressure sensor (not visible in the figures) in the differential pressure pressostat 13. The second pressure sensor is configured to measure a static pressure in the fluid flowing in the flow passage 11, when the system is in use. The differential pressure pressostat 13 is configured to determine a dynamic pressure in the flue gas flowing in the flow passage 11 based on signals from the first and second pressure sensors. Based on this dynamic pressure, the flow velocity can be calculated from the following equation, which is a simplified form of Bernoulli's equation:

$$P_{total} = P_{static} + P_{dynamic} = P_{static} + \tfrac{1}{2}\rho v^2$$

Wherein:
$P_{total}$ is the total pressure
$P_{static}$ is the static pressure
$P_{dynamic}$ is the dynamic pressure
$\rho$ is the density of the fluid
$v$ is the flow velocity of the fluid The dynamic pressure determined by the differential pressure pressostat 13 causes the differential pressure pressostat 13 to provide an output signal to the gas fireplace 1. This signal may be sent constantly or it may be sent only when the state of the gas supply is to be changed from "on" to "off" or vice versa. The output signal is used to ensure that the gas fireplace 1 is switched off, if the flow velocity falls to below a set threshold value.

FIGS. 3 to 6 show how the second gauge connector 15 is arranged within a space defined by a surrounding wall 16. In the illustrated embodiment, the surrounding wall 16 has five circular openings 17 facing towards the first gauge connector 14, but other shapes and numbers of the openings are also covered by the scope of the invention. The surrounding wall 16 and the openings 17 are dimensioned and shaped so that, when the flow measurement system is in use, the static pressure in the space is the same or substantially the same as around the first gauge connector 14, and there is no or substantially no flow of fluid in the space. By ensuring that there is no flow of fluid in the space, the formation of water droplets on the second gauge connector 15 is prevented. Hereby a more reliable and fault-safe measurement system is obtained. If the static pressure in the space and around the first gauge connector 14 were not the same or substantially the same, an erroneous flow velocity would be determined.

In the illustrated embodiment shown in FIGS. 3 to 6, the surrounding wall 16 is an end section of a part of the flow-defining wall of the volute 12. The first gauge connector 14 has a bent shape with a first section being parallel to a main flow direction of fluid flowing in the passage and a second section being perpendicular or substantially perpendicular to the main flow direction, when the system is in use.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Furthermore, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

What is claimed is:

1. A flow measurement system configured to control a gas fireplace, the flow measurement system comprising:
    a flow passage defined by at least one flow-defining wall, the flow passage being in fluid communication with the gas fireplace to be controlled and configured to convey exhaust gas from the gas fireplace,
    a differential pressure pressostat,
    a first gauge connector arranged in the flow passage and connected to a first pressure sensor in the differential pressure pressostat, which first pressure sensor is configured to measure a total pressure in a fluid flowing in the flow passage, when the system is in use, and
    a second gauge connector arranged in the flow passage and near the first gauge connector and connected to a second pressure sensor in the differential pressure pressostat, which second pressure sensor is configured to measure a static pressure in the fluid flowing in the flow passage, when the system is in use, wherein:
    the differential pressure pressostat is configured to determine a dynamic pressure in the fluid flowing in the flow passage, when the system is in use, based on signals from the first and second pressure sensors and in response thereto provide an output signal to the gas fireplace, and wherein:
    the second gauge connector is arranged within a space defined by a surrounding wall having at least one opening facing towards the first gauge connector, the surrounding wall and the at least one opening being dimensioned and shaped so that, when the flow measurement system is in use:
    the static pressure in the space is the same or substantially the same as around the first gauge connector, and
    there is no or substantially no flow of fluid in the space, whereby formation of water droplets on the second gauge connector is prevented.

2. The flow measurement system according to claim 1, wherein the surrounding wall has a plurality of openings facing towards the first gauge connector.

3. The flow measurement system according to claim 1, wherein the surrounding wall is an end section of a part of the at least one flow-defining wall.

4. The flow measurement system according to claim 1, wherein the first gauge connector has a bent shape with a first section being parallel to a main flow direction of fluid flowing in the flow passage and a second section being perpendicular or substantially perpendicular to the main flow direction, when the system is in use.

5. A chimney fan system for providing a controllable negative pressure along a chimney, wherein:
    the chimney fan system comprises a motor-driven exhaust fan and a flow measurement system according to claim 1, and
    an exhaust opening of the gas fireplace is connected to the chimney.

6. The chimney fan system according to claim 5, wherein the flow measurement system is provided in a flow passage of the exhaust fan.

7. The chimney fan system according to claim 5, wherein the flow measurement system is provided in the chimney.

8. The chimney fan system according to claim 5, wherein the chimney comprises two concentrically arranged chimney pipes connected to a gas fireplace.

9. The chimney fan system according to claim 8, wherein the differential pressure pressostat is configured to switch off the gas fireplace if the dynamic pressure is below a predetermined threshold value.

* * * * *